(12) United States Patent
Wu

(10) Patent No.: US 12,443,646 B2
(45) Date of Patent: Oct. 14, 2025

(54) METHOD AND APPARATUS FOR MULTIMEDIA RESOURCE MATCHING AND DISPLAY, ELECTRONIC DEVICE, AND MEDIUM

(71) Applicant: Beijing Bytedance Network Technology Co., Ltd., Beijing (CN)

(72) Inventor: Yiwen Wu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/089,432

(22) Filed: Dec. 27, 2022

(65) Prior Publication Data

US 2023/0140681 A1 May 4, 2023

Related U.S. Application Data

(63) Continuation of application No. PCT/CN2021/113807, filed on Aug. 20, 2021.

(30) Foreign Application Priority Data

Sep. 29, 2020 (CN) .......................... 202011052231.9

(51) Int. Cl.
*G06F 16/438* (2019.01)
*G06F 3/04847* (2022.01)
(Continued)

(52) U.S. Cl.
CPC ........ *G06F 16/438* (2019.01); *G06F 3/04847* (2013.01); *G06F 3/0488* (2013.01); *G06F 16/483* (2019.01)

(58) Field of Classification Search
CPC .............................. G06F 16/438; G06F 16/483
(Continued)

(56) References Cited

U.S. PATENT DOCUMENTS 9,201,925 B2 * 12/2015 Yang .................... G06F 16/9535
11,706,167 B2 * 7/2023 Luo ..................... G06F 16/7837
709/206
(Continued)

FOREIGN PATENT DOCUMENTS

CN      104111990 A    10/2014
CN      104239460 A    12/2014
(Continued)

OTHER PUBLICATIONS

International Patent Application No. PCT/CN2021/113807; Int'l Search Report; dated Nov. 1, 2021; 2 pages.
(Continued)

*Primary Examiner* — Kimberly L Wilson
(74) *Attorney, Agent, or Firm* — BakerHostetler

(57) ABSTRACT

The disclosure provides multimedia resource matching and displaying methods and apparatuses, an electronic device and a medium. The method includes: initiating a multimedia resource search request based on an acquired search keyword, acquiring at least one target multimedia resource matched with the search keyword, wherein the target multimedia resource includes target multimedia and target entity object information associated with the search keyword, and displaying at least one first search result card on a search result page, the first search result card including the target multimedia and the target entity object information. According to an embodiment of the disclosure, vividness, authenticity and intuition of information display are improved, and the efficiency of information communication is improved.

20 Claims, 7 Drawing Sheets

(51) Int. Cl.
*G06F 3/0488* (2022.01)
*G06F 16/483* (2019.01)

(58) Field of Classification Search
USPC .......................................................... 707/706
See application file for complete search history.

(56) References Cited

U.S. PATENT DOCUMENTS

| | | | | |
|---|---|---|---|---|
| 2012/0197763 | A1* | 8/2012 | Moreira | G06F 16/783 |
| | | | | 707/E17.014 |
| 2013/0205336 | A1* | 8/2013 | Ballai | H04N 21/442 |
| | | | | 725/32 |
| 2014/0150029 | A1* | 5/2014 | Avedissian | G11B 27/34 |
| | | | | 725/60 |
| 2017/0140006 | A1* | 5/2017 | Yang | G06F 16/9535 |
| 2017/0255625 | A1 | 9/2017 | Qin et al. | |
| 2018/0253406 | A1 | 9/2018 | Lin et al. | |

FOREIGN PATENT DOCUMENTS

| | | |
|---|---|---|
| CN | 108932253 A | 12/2018 |
| CN | 110597962 A | 12/2019 |
| CN | 111444356 A | 7/2020 |
| CN | 111611492 A | 9/2020 |
| CN | 112199524 A | 1/2021 |

OTHER PUBLICATIONS

European Patent Application No. 21874125.4; Extended Search Report; dated Sep. 8, 2023; 8 pages.
Written Opinion for International Application No. PCT/CN2021/113807, mailed Nov. 1, 2021, 9 pages.
Decision to refuse a European patent application (Art. 97(2) EPC) for Application No. 21874125.4, mailed Nov. 21, 2024, 4 pages.

* cited by examiner

METHOD AND APPARATUS FOR MULTIMEDIA RESOURCE MATCHING AND DISPLAY, ELECTRONIC DEVICE, AND MEDIUM

CROSS REFERENCE TO RELATED APPLICATIONS

This disclosure is a continuation of PCT application No. PCT/CN2021/113807, titled "METHOD AND APPARATUS FOR MULTIMEDIA RESOURCE MATCHING AND DISPLAY, ELECTRONIC DEVICE, AND MEDIUM", filed on Aug. 20, 2021, which claims priority to Chinese Patent Application No. 202011052231.9, field on Sep. 29, 2020, and entitled "METHOD AND APPARATUS FOR MULTIMEDIA RESOURCE MATCHING AND DISPLAY, ELECTRONIC DEVICE, AND MEDIUM", the entire contents of both of which are incorporated herein by reference.

FIELD

The disclosure relates to the technical field of e-commerce, in particular to method and apparatus for multimedia resource matching and display, electronic device, and medium.

BACKGROUND

With the development of the e-commerce technology, online shopping is gradually going deep into our lives as a new consumption mode. An important part of online shopping is searching for products in need. At present, when a keyword of commodity is searched on an e-commerce homepage, a search result card list of commodities meeting conditions is returned, and the search result card list includes some static resource description information such as commodity pictures and commodity prices.

Because the information that static resource description information can express is limited and is not intuitive and real enough, resulting in the user can not understand the product in depth, thus reducing the efficiency of information communication.

SUMMARY

In view of this, an embodiment of the disclosure provides a method and apparatus for multimedia resource matching and display, electronic device, and medium.

The first aspect of the disclosure provides a multimedia resource displaying method, comprising:
  initiating a multimedia resource search request based on an acquired search keyword;
  acquiring at least one target multimedia resource matched with the search keyword, wherein the target multimedia resource includes target multimedia and target entity object information associated with the search keyword; and
  displaying at least one first search result card on a search result page, the first search result card comprising the target multimedia and the target entity object information.

The second aspect of the disclosure provides a multimedia resource matching method, comprising:
  receiving a multimedia resource search request, the multimedia resource search request comprising a search keyword;
  determining at least one target multimedia resource matched with the search keyword, wherein the target multimedia resource includes target multimedia and target entity object information associated with the search keyword; and
  transmitting the at least one target multimedia resource.

The third aspect of the disclosure provides a multimedia resource displaying apparatus, comprising:
  a transmitting module, used for initiating a multimedia resource search request based on an acquired search keyword;
  an acquiring module, used for acquiring at least one target multimedia resource matched with the search keyword, wherein the target multimedia resource includes target multimedia and target entity object information associated with the search keyword; and
  a display module, used for displaying at least one first search result card on a search result page, the first search result card comprising the target multimedia and the target entity object information.

The fourth aspect of the disclosure provides a multimedia resource displaying apparatus, comprising:
  a receiving module, used for receiving a multimedia resource search request, the multimedia resource search request comprising a search keyword;
  a matching module, used for determining at least one target multimedia resource matched with the search keyword, wherein the target multimedia resource includes target multimedia and target entity object information associated with the search keyword; and a
  transmitting module, used for transmitting at least one target multimedia resource.

The fifth aspect of the disclosure provides an electronic device, comprising: a processor, a memory and a bus, wherein the processor is communicatively coupled to the memory via the bus when the electronic device runs, and the memory stores machine-readable instructions that upon execution by the processor cause the electronic device to perform the steps in any of the embodiments of the first or second aspect above.

The sixth aspect of the disclosure provides a computer-readable storage medium storing a computer program to perform the steps in any of the embodiments of the first or second aspect above.

With regard to the description of the effects of the above multimedia resource matching and displaying apparatuses, the electronic device and the medium, reference is made to the description of the above multimedia resource matching and displaying methods, which is not repeated herein.

According to the multimedia resource matching and displaying methods and apparatuses, the electronic device and the medium provided by an embodiment of the disclosure, a target multimedia resource is searched based on a search keyword, the target multimedia resource includes target entity object information matched with the search keyword, corresponding search result cards are generated based on the target entity object information and target multimedia, and the search result cards are displayed on a search result page. Compared with information conveyed by the static resource description information in the related technologies, the information conveyed in the multimedia resource is more vivid, intuitive and real, and therefore the information conveying efficiency is improved.

In order to make the aforementioned objectives, features and advantages of the disclosure more obvious and comprehensible, preferred embodiments accompanied with drawings are described in detail below.

BRIEF DESCRIPTION OF THE DRAWINGS

In order to more clearly illustrate the technical solutions of the embodiments of the disclosure, the drawings required in the embodiments will be briefly described below, and the drawings herein which are incorporated in and form a part of the specification illustrate the embodiments consistent with the disclosure and, together with the specification, serve to explain the technical solutions of the disclosure. It is to be understood that the following drawings illustrate only certain embodiments of the disclosure and thus cannot be considered as the limitation on its scope. Those of ordinary skill in the art may also derive other related drawings from these drawings without inventive work.

DETAILED DESCRIPTION OF THE EMBODIMENTS

Figure 1:
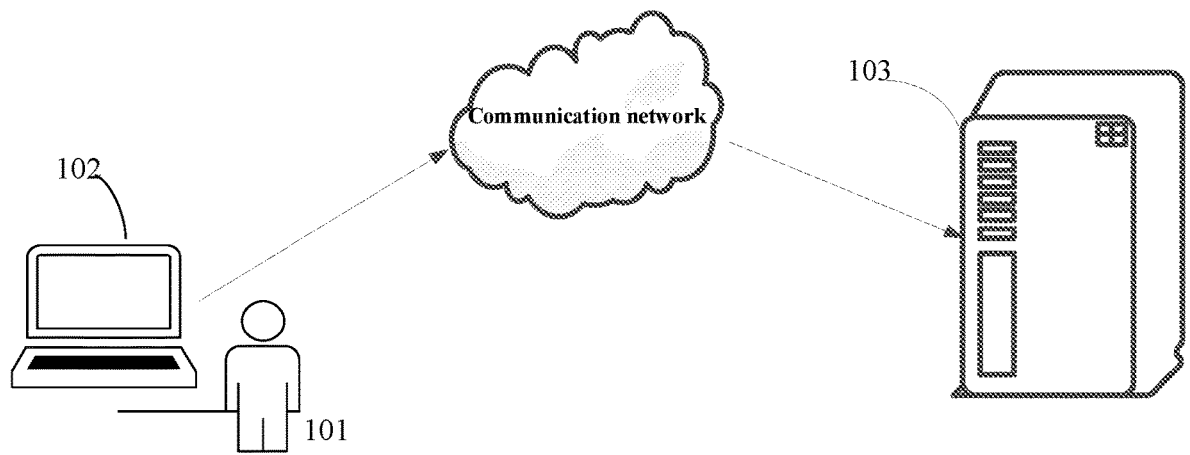
FIG. 1 shows a schematic diagram of an application scenario of a multimedia resource displaying method according to an embodiment of the disclosure.

To make the objectives, technical solutions and advantages of the embodiments of the disclosure more apparent, the technical solutions in the embodiments of the disclosure will be described clearly and completely with reference to the drawings in the embodiments of the disclosure, and it is obvious that the described embodiments are only part of the embodiments of the disclosure, not all of the embodiments. The components of the embodiments of the disclosure, as generally described and illustrated in the drawings herein, can be arranged and designed in a wide variety of different configurations. Thus, the following detailed description of the embodiments of the disclosure, provided in the drawings, is not intended to limit the scope of the disclosure, as claimed, but is merely representative of selected embodiments of the disclosure. All other embodiments, which can be derived by those skilled in the art from the embodiments of the disclosure without inventive work, shall fall within the protection scope of the disclosure.

Furthermore, the terms "first," "second", and the like in the specification and claims of the embodiments of the disclosure and in the above drawings are used for distinguishing between similar elements and not necessarily for describing a particular sequential or chronological order. It will be appreciated that the data so used may be interchanged under appropriate circumstances such that the embodiments described herein may be implemented in other sequences than those illustrated or described herein.

"A plurality of or several" mentioned herein means two or more. "And/or" describes the association relationship of associated objects, indicating that there may be three relationships, for example, A and/or B, which may indicate: A exists alone, A and B exist simultaneously, and B exists alone. The character "/" generally indicates that the associated objects are in an "or" relationship.

Research shows that at present, with regard to search of commodities and the like, a commodity list returned on a search result page only contains static resource description information such as commodity pictures and commodity prices. However, the static resource description information has certain limitation on information conveying, and a user cannot obtain real and intuitive commodity information by means of the static resource description information, so that the information conveying efficiency is reduced.

Based on the research, the disclosure provides a multimedia resource displaying method and a multimedia resource matching method, which can search a matched multimedia resource based on keywords contained in a multimedia resource search request, and generate search result cards based on entity object information corresponding to the multimedia resources and display them on a search result page. Compared with describing information through static resources, the disclosure can describe the displayed entity objects vividly, intuitively and realistically by using multimedia resources, and thus can improve the efficiency of information communication.

The above drawbacks are the results obtained by practice and careful study of the inventor, and therefore, the discovery process of the above drawbacks and the solutions for the drawbacks proposed by the disclosure hereinafter should be the contribution of the inventor to the disclosure.

It should be noted that similar labels and letters indicate similar items in the accompanying drawings below, so that once an item is defined in one accompanying drawing, it does not need to be further defined and explained in the subsequent accompanying drawings.

To facilitate understanding of the embodiments, first, a multimedia resource displaying method and a multimedia resource matching method disclosed in the embodiments of the disclosure are described in detail. An execution subject of the multimedia resource displaying method provided in the embodiments of the disclosure is generally an electronic device with certain computing capability, and the electronic device, for example, includes: a terminal device, or a server or other processing devices, wherein the terminal device may be a user equipment (UE), a mobile device, a user terminal, a terminal, a cellular phone, a cordless phone, a personal digital assistant (PDA), a handheld device, a computing device, a vehicle-mounted device, a wearable device or the like. In some possible implementations, the multimedia resource displaying method may be implemented by invoking computer readable instructions stored in a memory via a processor.

The multimedia resource displaying method provided by the embodiment of the disclosure is described below by an example that an execution subject is a terminal device.

Referring to FIG. 1, a schematic diagram of an application scenario of a multimedia resource displaying method is shown as follows.

A user 101 logs in a server 103 by means of an application client installed in a terminal device 102, wherein the application client may be a browser of a web page or an application client installed in a terminal device such as a mobile phone and a tablet computer. The terminal device 102 is communicatively connected to the server 103 via a network, which can be a local area network, cellular network, wide area network, etc. The terminal device 102 may be a portable device (for example, a mobile phone, a tablet computer, a notebook computer and the like) or a personal computer (PC), and the server 103 may be any device capable of providing internet services.

The user 101 inputs a multimedia resource search request by means of the client installed in the terminal device 102; the terminal device 102 transmits the request to the server 103; and in response to the multimedia resource search request transmitted by the client, the server 103 searches for a matched target multimedia resource according to a search keyword carried in the multimedia resource search request. In the embodiment of the disclosure, the target multimedia resource includes target multimedia and a target entity object, wherein description information of the target multimedia is matched with the search keyword, and the target entity object information is matched with the search keyword. Therefore, based on the solution provided by the embodiment of the disclosure, in one implementation manner, the server can return the matched target multimedia resource to the client, the client generates a search result card that contains the target multimedia and the target entity object information based on the acquired target multimedia resource, and the search result card is displayed on a search result page. In another implementation manner, the search result card may also be directly generated and transmitted to the client by the server 103, and the client may display the search result card on the search result page.

Embodiment I

Figure 2:
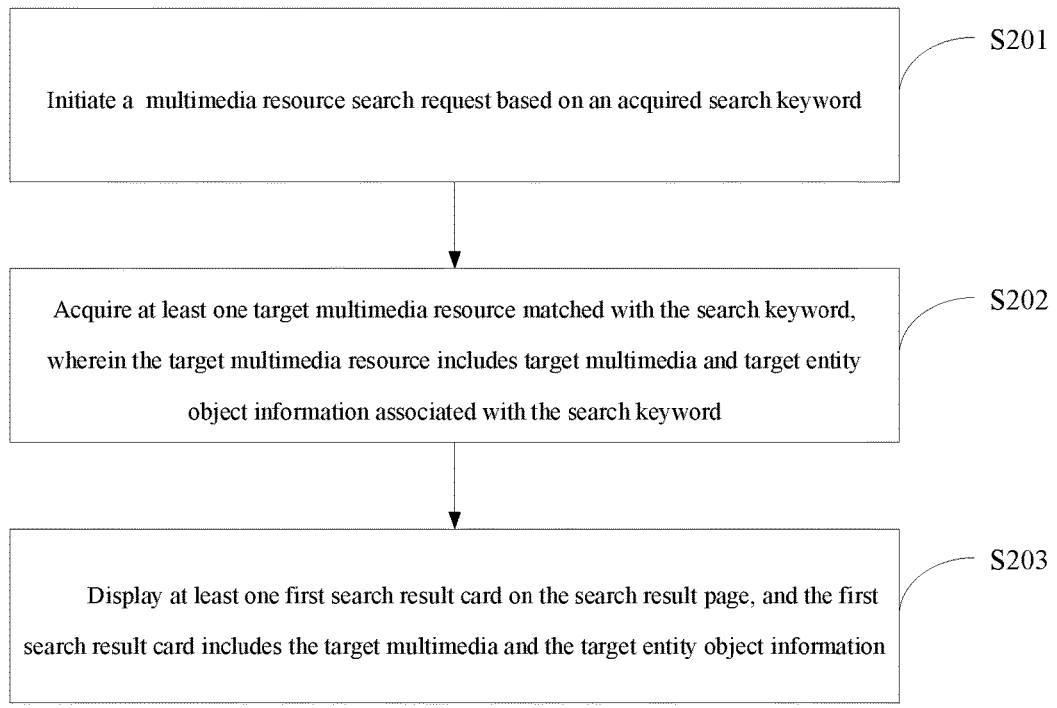
FIG. 2 shows a flow chart of a multimedia resource displaying method according to an embodiment of the disclosure.

Referring to FIG. 2 which is a flow chart of a multimedia resource displaying method according to Embodiment I of the disclosure, the method includes the following steps.

S201: a multimedia resource search request is initiated based on an acquired search keyword.

In some embodiments, a user may submit a search keyword by means of a client installed in the terminal device 102 according to his needs, and the client initiates a multimedia resource search request to the server 103 based on the search keyword submitted by the user. The multimedia related in the embodiment of the disclosure may be, but is not limited to, a video, including long or short videos and other web resources that can dynamically display entity objects.

In an example that "girl's dressing" is taken as the search keyword, a user submits the search keyword by means of a search box displayed on a display interface of the client, and the client initiates a multimedia resource search request to the server based on the search keyword submitted by the user.

S202: at least one target multimedia resource matched with the search keyword is acquired, wherein the target multimedia resource includes target multimedia and target entity object information associated with the search keyword.

The entity object may be a commodity displayed in the multimedia, for example, commodities such as clothes and lipsticks shown by users in videos can be called entity objects.

In this step, after receiving the multimedia resource search request sent by the client, the server 103 searches for a target multimedia resource meeting conditions according to the search keyword carried therein and returns the target multimedia resource to the client. In the embodiment of the disclosure, in order to improve information transmission efficiency, in an implementation manner, according to a search keyword submitted by a user, target multimedia matched with the search keyword may be first searched; attribute information of an entity object included in the target multimedia is further matched based on the search keyword, an entity object matched with the attribute information is determined to be a target entity object, and it is determined that the target entity object information and the target multimedia form a target multimedia resource.

In some embodiments, the server 103 first searches for a target entity object whose attribute information is matched with the search keyword according to the search keyword, and then further determines whether the target entity object is corresponding to target multimedia, and determines that the target multimedia and the target entity object information form a target multimedia resource.

The entity object information includes at least one of information such as picture, description, price and link of the entity object. The attribute information of the entity object may include the name and category of the entity object, the name of a store providing the entity object, and the like. It should be noted that the entity object information and the attribute information of the entity object may include partially overlapping information.

S203: at least one first search result card is displayed on the search result page, and the first search result card includes the target multimedia and the target entity object information.

In this step, with regard to any target multimedia resource obtained in step S202, the client may generate a first search result card corresponding to the target multimedia resource according to the following process.

Step 1, a multimedia display card is generated based on the target multimedia in the target multimedia resource.

In some embodiments, the client can generate a multimedia display card according to the whole content of the target multimedia, or the client can extract part of video frames from the target multimedia to generate a dynamic image corresponding to the target multimedia, and generate a multimedia display card according to the dynamic image.

Figure 3A:
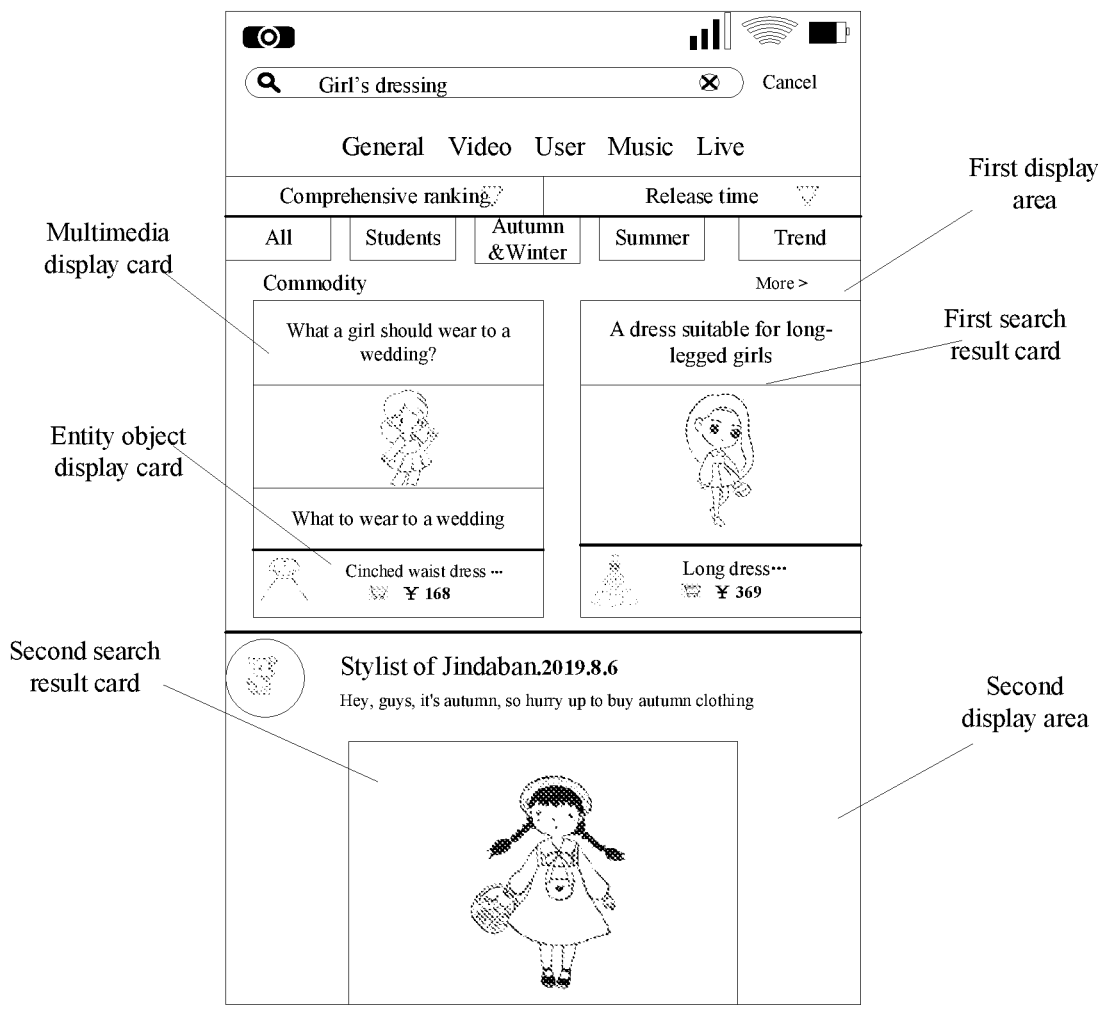
FIG. 3a shows a display view of a search result page according to an embodiment of the disclosure.
Figure 3B:
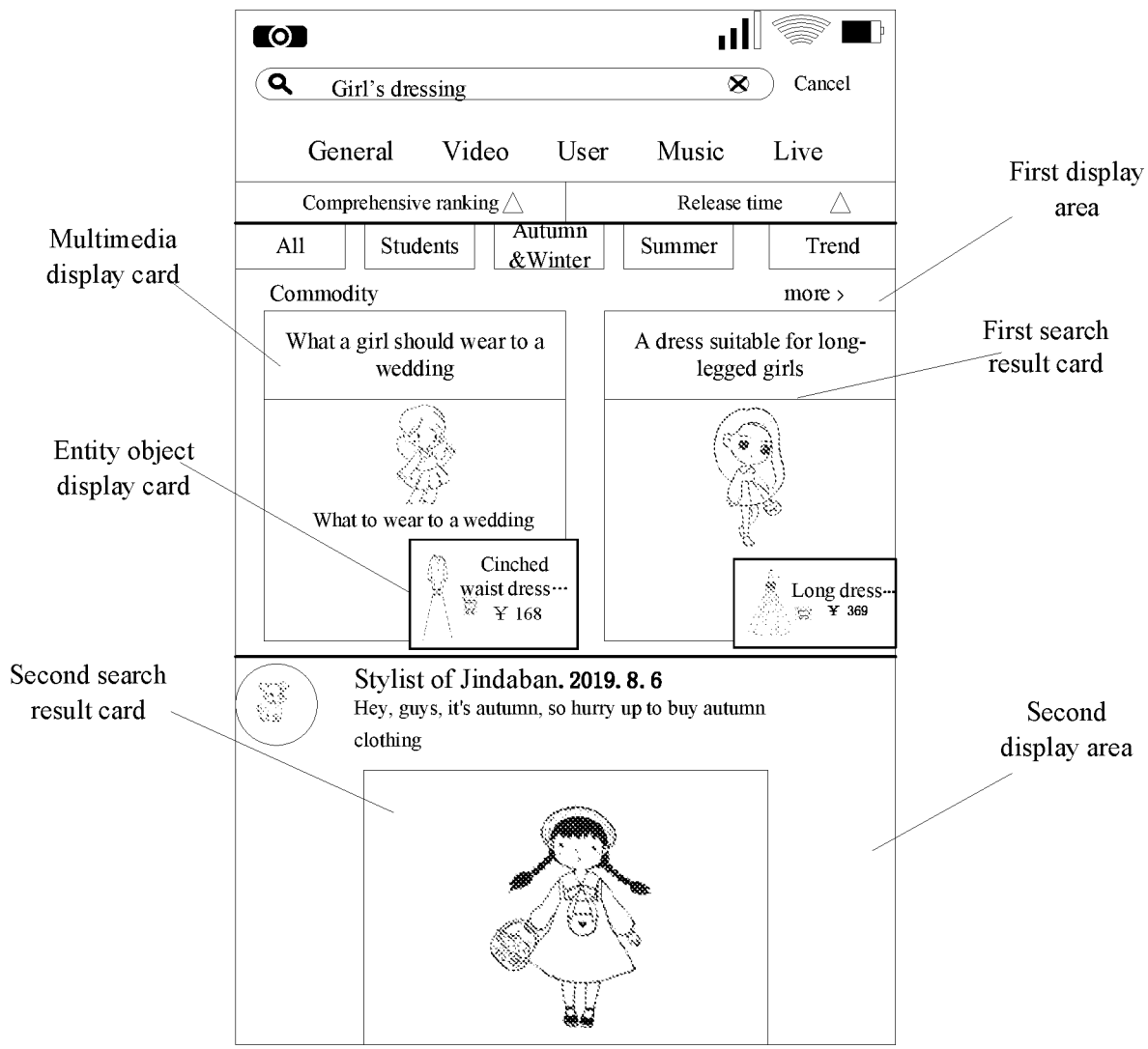
FIG. 3b shows a display view of a search result page searched based on a search keyword by another multimedia resource displaying method according to an embodiment of the disclosure.

In an example that "girl's dressing" is taken as the search keyword, as shown in FIG. 3a or FIG. 3b which is a schematic diagram showing effects of a multimedia display card generated by the client based on a target multimedia resource returned by the server. Target multimedia includes description information matched with the search keyword "girl's dressing", including "what a girl should wear to a wedding" and "what to wear to a wedding".

Step 2, an entity object display card is generated based on the target entity object information included in the target multimedia resource.

The target entity object information includes information such as pictures, introduction, price and link of the entity object, and the entity object display card generated based on this information is shown in FIG. 3a or FIG. 3b.

Step 3, the entity object display card and the multimedia display card are merged to obtain a first search result card.

There are various ways to merge for specific implementation. In one embodiment, the entity object display card is stitched with the multimedia display card in a left-right structure. In another embodiment, the entity object display card is stitched with the multimedia display card in an up-down structure, as shown in FIG. 3a, which is a schematic diagram showing effects of stitching the entity object display card with the multimedia display card in an up-down structure. And in yet another embodiment, the entity object display card may be overlayed on the top of the multimedia display card in a floating manner, as shown in FIG. 3b, which is a schematic diagram showing effects of overlaying the entity object display card on top of the multimedia display card in a floating manner.

It should be noted that, if a plurality of target multimedia resources are returned by the server, with regard to each target multimedia resource, the client generates first search result cards corresponding to the target multimedia resources respectively according to the above process, and displays an aggregation result of the individual first search result cards on a search result page, as shown in FIG. 3a or FIG. 3b.

In specific implementation, if there are a plurality of first search result cards, the first search result cards may be ranked according to access heat, online time, and the like of the target multimedia included in the target multimedia resource, which is not limited by the embodiment of the disclosure.

In another implementation manner, the target multimedia included in the target multimedia resource can be identified, and association information between the target multimedia included in the target multimedia resource and the target entity object can be acquired, the number of multimedia frames in which the target entity object appears in the target multimedia is determined based on the acquired association information, and the display sequence of the at least one first search result card is determined based on the number of the multimedia frames.

In specific implementation, with regard to any target multimedia, the number of multimedia frames in which the target entity object appears in the multimedia is counted based on the target entity object bound to the target multimedia, and the association information between the target media and the target entity object is generated based on the number of the multimedia frames. The association information between the target multimedia and the target entity object may be generated by the client according to the above-mentioned process, or may be generated by the server and transmitted to the client, which is not limited by the embodiment of the disclosure.

For example, the at least one first search structure card may be ranked based on the number of multimedia frames from more to less. The target multimedia contained in the at least one first search result card is played according to the arrangement sequence of the first search result cards; or if the multimedia display cards are generated according to dynamic images corresponding to the target multimedia, target dynamic images contained in the first search result cards are played according to the arrangement sequence of the first search result cards.

Embodiment II

On the basis of Embodiment I, with regard to multimedia whose description information is matched with the search keyword but whose attribute information of the displayed entity object is not matched with the search keyword, the multimedia is referred to as candidate multimedia in the embodiment of the disclosure in order to distinguish the multimedia from the target multimedia, and an entity object displayed in the candidate multimedia is referred to as a candidate entity object.

According to the embodiment of the disclosure, the server can return at least one candidate multimedia while returning the target multimedia resource to the client. With regard to each candidate multimedia, the client generates a multimedia display card based on the candidate multimedia to obtain a second search result card. In some embodiments, the client can generate a multimedia display card according to the whole content of the candidate multimedia, or the client can extract part of multimedia frames from the candidate multimedia to generate a dynamic image corresponding to the candidate multimedia, and generate the multimedia display card according to the dynamic image.

Correspondingly, the at least one first search result card and the at least one second search result card may be displayed simultaneously on the search result page.

In one embodiment, the search result page may be divided into a first display area and a second display area, as shown in FIG. 3a or FIG. 3b, wherein the aggregation result of at least one first search result card is displayed in the first display area, and at least one second search result card is displayed in the second display area.

At least one first search result card can be arranged and displayed in a horizontal direction in the first display area, and at least one second search result card is arranged and displayed in a vertical direction in the second display area. Correspondingly, if a user's touch operation for the search result cards is detected, in response to the user's touch operation, if the touch operation is detected to form a lateral sliding track in the first display area, at least one first search result card is controlled to slide according to the direction of the lateral sliding track; and if the touch operation is detected to form a longitudinal sliding track in the second display area, at least one second search result card is controlled to slide according to the direction of the longitudinal sliding track.

Referring to FIG. 3a or FIG. 3b, an aggregation result of the first search result cards generated according to at least one target multimedia resource is displayed in the first display area of the search result page, and the first search result cards are displayed in the horizontal direction in the first display area. At least one second search result card is displayed in the second display area of the search result page, and the second search result cards are arranged and displayed in the vertical direction in the second display area.

In one embodiment, when the search result page displays the first search result cards and the second search result cards, the target multimedia in at least one first search result card can be played according to the display sequence of the first search result cards; or a target dynamic image contained in the first search result card ranked first is played, the target dynamic image being generated according to multimedia frames extracted from the target multimedia.

In some embodiments, a link address for a detail page may also be added to the entity object display card included in the first search result card, and when it is detected that the entity object display card is triggered, it skips to the detail page according to the link address of the detail page. In another embodiment, a link address of the target multimedia can be added to the entity object display card, and when it is detected that the entity object display card is triggered, it skips to a display page of the target multimedia according to the link address of the target multimedia.

The multimedia resource matching method provided by the embodiment of the disclosure is described below by taking an execution subject as a server.

Embodiment III

Figure 4:
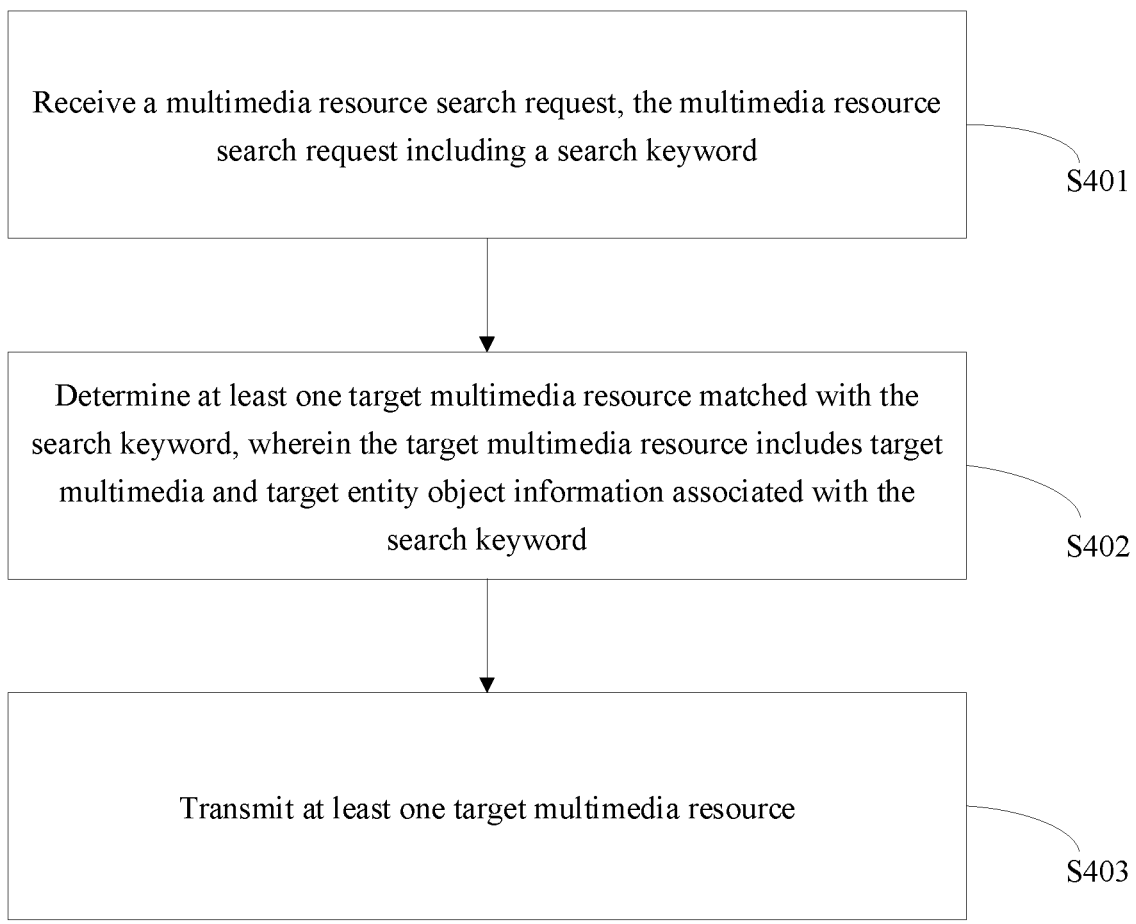
FIG. 4 shows a flow chart of a multimedia resource matching method according to an embodiment of the disclosure.

Referring to FIG. 4, which is a flow chart of a multimedia resource matching method according to Embodiment III of the disclosure, the method includes the following steps.

S401: a multimedia resource search request is received, and the multimedia resource search request includes a search keyword.

In this step, after receiving a search keyword submitted by a user, a client transmits a multimedia resource search request to a server based on the received search keyword.

S402: at least one target multimedia resource matched with the search keyword is determined, wherein the target multimedia resource includes target multimedia and target entity object information associated with the search keyword.

In order to facilitate search of a user, in one embodiment, description information is added for multimedia, and the description information may include, but is not limited to, an applicable scenario of an entity object shown in the multimedia, an applicable user group, and the like. For example, the description information for a schoolbag may include "schoolbag, pupils in 1-3 grades, girl", and the like, and the search keywords are matched with the description information of the multimedia, in which case the server may match a multimedia list meeting conditions according to the search keywords.

In another embodiment, the server may further maintain an entity object library, and the entity object library includes an entity object identifier, attribute information of the entity object, and a multimedia identifier including the entity object. With regard to any entity object, if the entity object has no corresponding multimedia, a field corresponding to the multimedia identifier in the entity object library is empty, as shown in table 1, which is a possible structure of the entity object library maintained by the server:

TABLE 1

| Entity object identifier | Attribute information of an entity object | Multimedia identifier |
|---|---|---|
| O1 | S11 | M1 |
|  | S12 |  |
|  | S13 |  |
|  | ... |  |
| O2 | S21 |  |
|  | S22 |  |
|  | ... |  |
| ... | ... | ... |

A display object (which may include but is not limited to a commodity) generally corresponds to the attribute information of the entity object, and the attribute information of the entity object may include the name and the category of the entity object, and the name of a store providing the entity object. In this case, the server may match with an entity object list meeting conditions based on the search keyword.

In order to meet the needs of a user who needs to purchase commodities, the multimedia can also contain entity object information, and the entity object information includes at least one of information such as pictures, the introduction, price and link of the entity object. In the embodiment of the disclosure, based on a searched multimedia list matched with the search keyword, the server further screens out multimedia added with an entity object from the multimedia list, and determines attribute information and a target entity object matched with the search keyword, the multimedia containing the target entity object is taken as target multimedia; and the target multimedia and the target entity object information form a target multimedia resource. With regard to a searched entity object list, the server further screens out a target entity object corresponding to the multimedia, the multimedia corresponding to the target entity object is target multimedia, and the target multimedia and the target entity object information form a target multimedia resource.

The above two processes of matching with target multimedia resources are described below with reference to FIG. 5 and FIG. 6, respectively.

The First Manner

Figure 5:
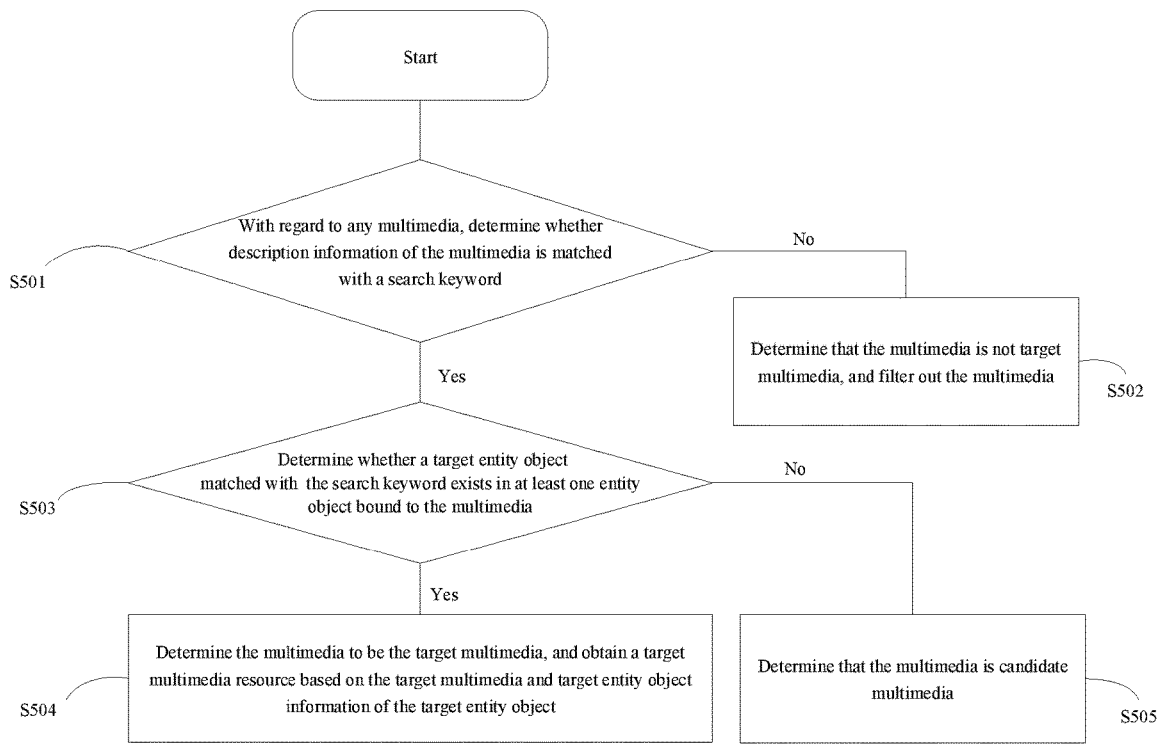
FIG. 5 shows a flow chart illustrating a specific method for searching for a matched target multimedia resource based on description information of a multimedia resource according to an embodiment of the disclosure.

As shown in FIG. 5 which is a schematic flow chart of a first process for searching for a matched target multimedia resource according to description information of multimedia, the first process includes the following steps:

S501: with regard to any multimedia, whether description information of the multimedia is matched with a search keyword is determined, if the description information of the multimedia is matched with the search keyword, step S503 is executed, otherwise, step S502 is executed.

For example, a user searches for "girl's dressing", and the server first searches for multimedia resource whose description information is matched with the search keyword "girl's dressing".

S502: it is determined that the multimedia is not the target multimedia, the multimedia is filtered out, and the process is ended.

When the description information of the multimedia is not matched with the search keyword, it indicates that the multimedia is not the target multimedia, the multimedia is filtered out, and the process is ended.

S503: whether a target entity object matched with the search keyword exists in at least one entity object bound to the multimedia is determined, if the target entity object matched with the search keyword exists in at least one entity object bound to the multimedia, step S504 is executed, otherwise step S505 is executed.

When the description information of the multimedia in step S501 is matched with the search keyword, whether the entity object corresponding to the multimedia is a target entity object needs to be further determined, wherein whether the attribute information of the target entity object is matched with the search keyword is determined, if the attribute information of the target entity object is matched with the search keyword, step S504 is executed, otherwise step S505 is executed.

In this step, with regard to the multimedia resource whose description information searched in step S501 is matched with the search keyword "girl's dressing", the multimedia resource matched with the "girl's dressing" in the feature information of the displayed commodity is selected.

S504: the multimedia is determined to be target multimedia, a target multimedia resource is obtained based on the target multimedia and the target entity object information of the target entity object, and the process is ended.

If the determination in step S501 and the determination in step S503 are both true, that is, the description information of the multimedia is matched with the search keyword, and the attribute information of the entity object included in the multimedia is also matched with the search keyword, it is determined that the multimedia is the target multimedia, and the target multimedia and the corresponding target entity object information form the target multimedia resource. The process is ended.

S505: the multimedia is determined to be candidate multimedia.

In some embodiments, when the description information of the multimedia is matched with the search keyword, but the attribute information of the entity object contained in the multimedia is not matched with the search keyword, the multimedia is determined to be the candidate multimedia.

The server transmits the determined target multimedia resource to a client, and in another embodiment, the server may further transmit the candidate multimedia to the client while transmitting the target multimedia resource.

In some embodiments, with regard to any multimedia, based on at least one entity object bound to the multimedia, the server may further count the number of multimedia frames in which each entity object appears in the multimedia respectively, and association information between the multimedia and each entity object is generated based on the number of the multimedia frames.

For example, three entity objects, namely "lipstick", "clothes" and "schoolbag", are bound to certain multimedia; with regard to each entity object, the number of multimedia frames containing each entity object in the multimedia is determined by identifying the multimedia, and the association information between the multimedia and each entity object is generated based on the number of the multimedia frames.

In an example that the number of multimedia frames containing "lipstick" is 600, the number of multimedia frames containing "clothes" is 150, and the number of multimedia frames containing "schoolbag" is 200 in the multimedia, the association information generated for each display object may be represented as (lipstick, 600), (clothes, 150), (schoolbag, 200), and while the target multimedia resource is returned to the client, the association information between the target multimedia and the target entity object bound in the target multimedia may also be returned. The client can rank and display different target multimedia resources according to the association information.

The Second Manner

Figure 6:
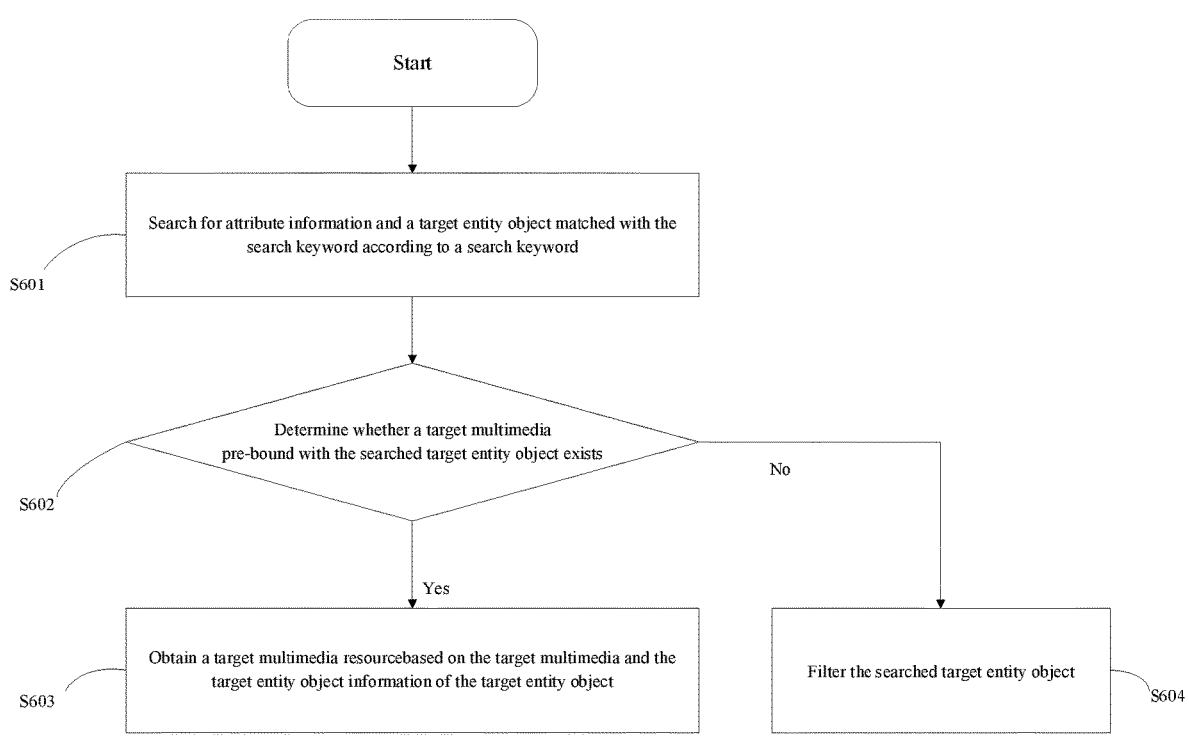
FIG. 6 shows a flow chart illustrating a specific method for searching for a matched target multimedia resource based on feature information of a display entity object according to an embodiment of the disclosure.

As shown in FIG. 6 which is a flow chart of a second process for searching for a matched target multimedia resource according to attribute information of an entity object, the second process includes the following steps:

S601: a target entity object whose attribute information is matched with a search keyword is searched according to a search keyword.

In this embodiment, the server may search for, according to the search keyword, attribute information of the entity object matched with the search keyword in Table 1, generate a corresponding entity object list based on an entity object identifier corresponding to the matched attribute information, and determine, according to Table 1, whether each entity object has pre-bound target multimedia based on the generated entity object list. For example, the server first searches for a commodity list matched with "girl's dress-ing", and with regard to each commodity contained in the searched commodity list, the server determines whether a corresponding video exists, and if the corresponding video exists, the corresponding video is used as target multimedia.

S602: whether a target multimedia pre-bound with the searched target entity object exists is determined, and if the pre-bound target multimedia exists in the searched target entity object, step S603 is executed, otherwise step S604 is executed.

S603: a target multimedia resource is obtained based on the target multimedia and the target entity object information of the target entity object, and the process is ended.

In this step, with regard to each commodity in the searched commodity list in step S601, whether a corresponding video for the commodity exists is determined; and if the corresponding video for the commodity exists, it can be determined that the corresponding video is the target multimedia, and the process is ended.

S604: the searched target entity object is filtered.

If no target multimedia corresponding to a searched target entity object, the searched target entity object is filtered out.

By the above process, with regard to any search keyword, no matter what way the multimedia is searched, the multimedia contains the target entity object information matched with the search keyword.

S403: at least one target multimedia resource is transmitted.

In one implementation manner, before transmitting at least one target multimedia resource, the server may further identify, with regard to any target multimedia resource, target multimedia included in the target multimedia resource, and determine at least one candidate entity object appearing in the target multimedia. Whether a target entity object matched with the search keyword exists in at least one candidate entity object is determined, and if the target entity object matched with the search keyword does not exist, the target multimedia resource is filtered.

For example, with regard to a certain video resource matched with the search keyword "girl's dressing", if it is determined that the video resource does not contain a commodity related to "girl's dressing" by parsing video frames extracted from the video resource, the video resource is filtered out from a target multimedia resource returned to the client, so as to improve the accuracy of the search result.

With regard to the determined target multimedia resource, the server can generate a search result card based on the target multimedia and the target entity object information contained in the target multimedia resource, and the search result card is returned to the client and displayed by the client. The process of generating the search result card by the server is similar to the process of generating the search result card by the client, which is not described in detail here.

Embodiment IV

Embodiment IV supports classified search based on the embodiment 1, the embodiment 2 and the embodiment 3, that is, a user can search under a certain category. In this embodiment, the search scope in step S402 is only limited to the category specified by the user.

In some embodiments, a user may select search label information on a search page. The search label information may be selected by the user according to a label designed in advance by the client. The client transmits a multimedia resource search request to the server based on the search label information selected by the user and the search keyword. The server determines the search scope according to the search label information, and searches for a target multimedia resource in the determined search scope according to the process as shown in FIG. 5 or FIG. 6. The specific implementation process may refer to the process as shown in FIG. 5 or FIG. 6, which is not described in detail here.

Figure 7:
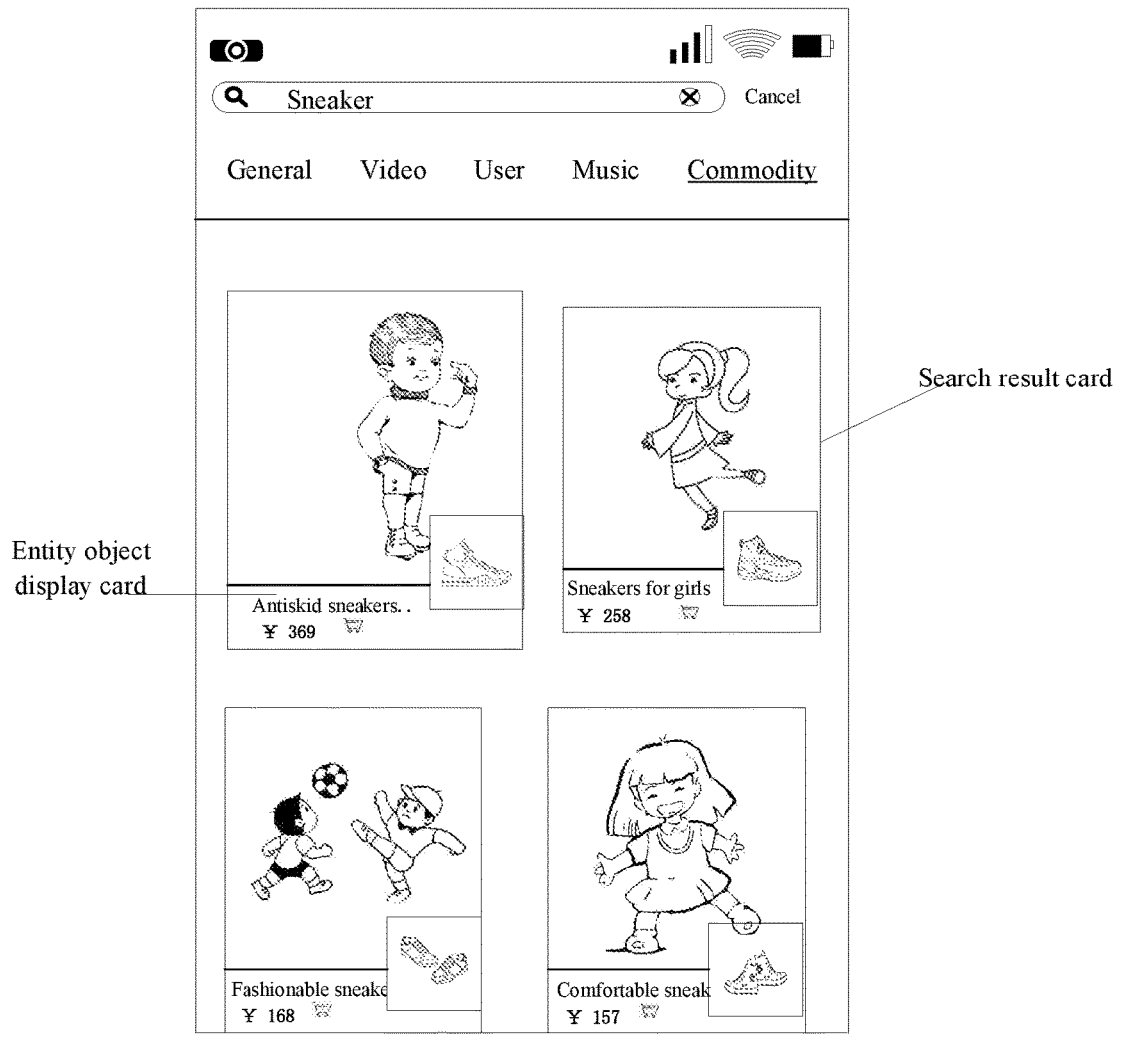
FIG. 7 shows a display view of a search result page searched based on search label information and a search keyword by a multimedia resource displaying method according to an embodiment of the disclosure.

As shown in FIG. 7, the search result page is obtained by performing a search in a certain category, and the aggregation result of the search result cards generated according to the target multimedia resource is displayed on the search result page in an aggregated manner. Each search result card may display a target entity object display card in a floating window.

In the embodiments of the disclosure, the target multimedia resource matched with the search keyword is searched by means of the search keyword, and the search result cards are generated based on the target multimedia and the target entity object information contained in the target multimedia resource and are displayed on the search result page. Compared with information conveyed by the static resource description information in the related technologies, multimedia resources are more realistic, intuitive and generative in their representation of information, thus improving the efficiency of information conveyance.

It can be understood by those skilled in the art that in the above method of the specific implementation manners, the order of writing the steps does not imply a strict order of execution and does not impose any limitations on the implementation, and the order of specific execution of the steps should be determined by their functions and possibly inherent logic.

Based on the same inventive concept, an embodiment of the disclosure further provides a multimedia resource displaying apparatus corresponding to the multimedia resource displaying method. As the principle of solving the problem of the apparatus in the embodiment of the disclosure is similar to that of the above multimedia resource displaying method in the embodiment of the disclosure, the implementation of the apparatus may refer to the implementation of the method, and the repeated parts are not described again.

Embodiment V

Figure 8:
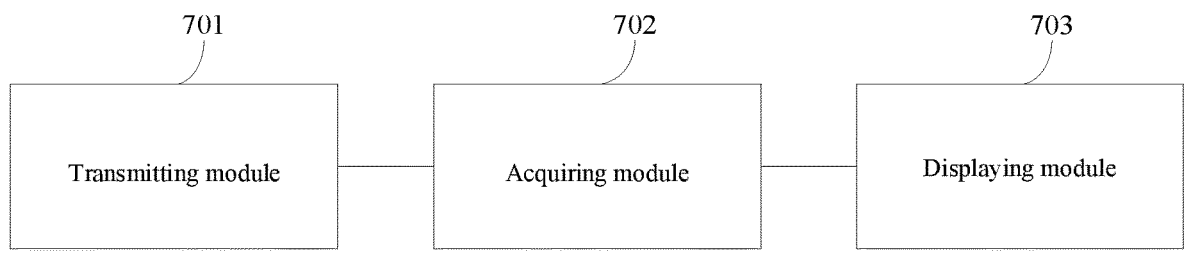
FIG. 8 shows a schematic diagram of a multimedia resource displaying apparatus according to an embodiment of the disclosure.

Referring to FIG. 8, a schematic diagram of a multimedia resource display apparatus provided in embodiment V of the disclosure, the apparatus comprising: a transmitting module 701, an acquiring module 702, and a display module 703.

The transmitting module 701 is used for initiating a multimedia resource search request based on an acquired search keyword.

The acquiring module 702 is used for acquiring at least one target multimedia resource matched with the search keyword, wherein the target multimedia resource includes target multimedia and target entity object information associated with the search keyword; and The display module 703 is used for displaying at least one first search result card on a search result page, the first search result card comprising the target multimedia and the target entity object information.

In some embodiments, the apparatus further comprises:
  a generating module, used for generating a multimedia display card based on the target multimedia included in the target multimedia resource, and generating an entity object display card based on the target entity object information included in the target multimedia resource; and merging the entity object display card and the multimedia display card to obtain the first search result card.

In some embodiments, the generating module used for stitching the entity object display card with the multimedia display card in a left-right structure, or stitching the entity object display card with the multimedia display card in an up-down structure, or overlaying the entity object display card on top of the multimedia display card in a floating mode.

In some embodiments, the search result page comprises a first display area and a second display area, and
  the acquiring module is used for acquiring at least one candidate multimedia matched with the search keyword, and
  the display module is further used for displaying an aggregation result of the at least one first search result card in the first display area of the search result page, and displaying at least one second search result card in the second display area of the search result page, the second search result card comprising the candidate multimedia.

In some embodiments, the display module is further used for acquiring association information between the target multimedia included in the target multimedia resource and a target entity object, determining the number of multimedia frames in which the target entity object appears in the target multimedia based on the association information, and determining a display sequence of the at least one first search result card based on the number of the multimedia frames.

In some embodiments, the display module arranges and displays the at least one first search result card in the first display area according to a horizontal direction, and
  the apparatus further comprises:
  a first response module, used for controlling, in response to a touch operation of a user, if the touch operation is detected to form a lateral sliding track in the first display area, the at least one first search result card to slide in a direction of the lateral sliding track.

In some embodiments, the target multimedia comprises a target dynamic image, and the target dynamic image is generated based on the multimedia frames extracted from the target multimedia, and
  the apparatus further comprises:
  a playing module, used for playing the target multimedia in the at least one first search result card based on the display sequence of the first search result cards, or playing the target dynamic image contained in the at least one first search result card.

In some embodiments, the target entity object display card is added with a link address of a detail page, and
  the apparatus further comprises:
  a detection module, used for skipping to the detail page of the target entity object according to the link address of the detail page, if the target entity object display card is triggered.

Embodiment VI

Figure 9:
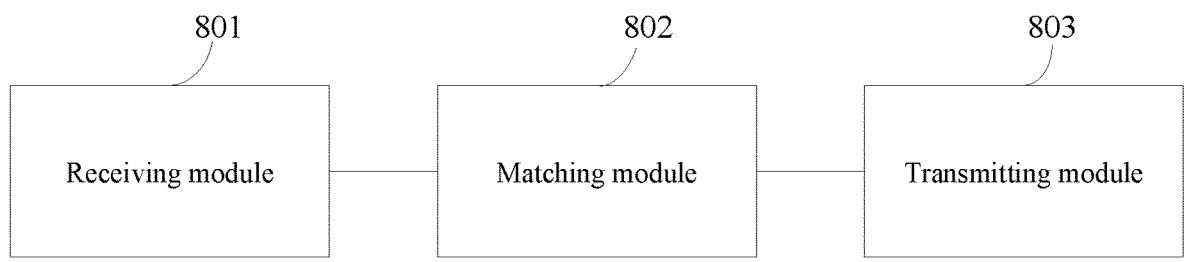
FIG. 9 shows a schematic diagram of a multimedia resource matching apparatus according to an embodiment of the disclosure.

Referring to FIG. 9, a schematic diagram of a multimedia resource matching apparatus provided in Embodiment VI of the disclosure, the apparatus comprising: a receiving module 801, a matching module 802, and a transmitting module 803.

The receiving module 801 is used for receiving a multimedia resource search request, the multimedia resource search request comprising a search keyword;

The matching module 802 is used for determining at least one target multimedia resource matched with the search keyword, wherein the target multimedia resource includes target multimedia and target entity object information associated with the search keyword; and The transmitting module 803 is used for transmitting at least one target multimedia resource.

In some embodiments, the matching module is further used for determining whether description information of the multimedia is matched with the search keyword, if the description information of the multimedia is matched with the search keyword, determining whether a target entity object matched with the keyword exists in at least one entity object bound to the multimedia, and if the target entity object matched with the search keyword exists, determining the multimedia as target multimedia, and obtaining the target multimedia resource based on the target multimedia and the target entity object information of the target entity object.

In some embodiments, the apparatus further comprises:
an identifying module, used for identifying the target multimedia included in the target multimedia resource, determining at least one candidate entity object that appears in the target multimedia, determining, among the at least one candidate entity object, whether there exists a target entity object that matches the search keyword, and filtering the target multimedia resource if no target entity object exists that matches the search keyword.

In some embodiments, the apparatus further comprises:
a counting module, used for counting the number of multimedia frames in which each the entity object appears in the multimedia, based on at least one entity object bound to the multimedia, respectively.
a generating module, used for generating association information between the multimedia and each of the entity objects based on said number of multimedia frames In some embodiments, the matching module is further used for searching for a target entity object matched with the search keyword according to the search keyword, searching for whether a target multimedia pre-bound with the target entity object exists, and if the target multimedia pre-bound with the target entity object exists, obtaining the target multimedia resource based on the target multimedia and the target entity object information of the target entity object.

In some embodiments, the apparatus further comprises:
a merging module, used for generating a multimedia display card based on the target multimedia in the target multimedia resource, generating an entity object display card based on the target entity object information included in the target multimedia resource, merging the entity object display card with the multimedia display card to obtain a first search result card, and transmitting the first search result card.

Embodiment VII

Figure 10:
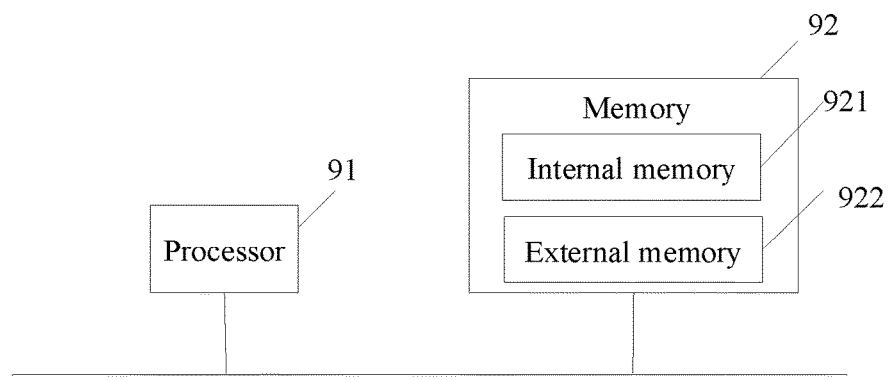
FIG. 10 shows a schematic diagram of an electronic device according to an embodiment of the disclosure.

Embodiments of the disclosure also provide an electronic device, as shown in FIG. 10, a schematic diagram of the structure of the electronic device provided by Embodiment VII of the disclosure, comprising:
a processor 91 and a memory 92. The memory 92 stores machine-readable instructions executable by the processor 91, and the processor 91 is used to execute the machine-readable instructions stored in memory 92. When the machine readable instructions are executed by the processor 91, the processor 91 performs the following steps: S201: initiating a multimedia resource search request based on an acquired search keyword; S202: acquiring at least one target multimedia resource matched with the search keyword, wherein the target multimedia resource includes target multimedia and target entity object information associated with the search keyword; S203: displaying at least one first search result card on the search result page, the first search result card including the target multimedia and the target entity object information. Or when the machine readable instructions are executed by the processor 91, the processor 91 performs the following steps: S401: receiving a multimedia resource search request, the multimedia resource search request including a search keyword; S402: determining at least one target multimedia resource matched with the search keyword, the target multimedia resource including target multimedia and target entity object information associated with the search keyword. S403: transmitting at least one target multimedia resource.

The memory 92 described above includes memory 921 and external memory 922. memory 921, also referred to herein as internal memory, is used to temporarily store computing data in processor 91 and data exchanged with external memory 922 such as a hard disk, and processor 91 exchanges data with external memory 922 through memory 921.

Embodiments of the disclosure further provide a computer-readable storage medium storing a computer program to perform the steps of the multimedia resource displaying method, or the steps of the multimedia resource matching method described in the above method embodiments when the computer program are executed by a processor. The storage medium may be a volatile or non-volatile computer readable storage medium.

The computer program product of a multimedia resource displaying method, a multimedia resource matching method provided by embodiments of the disclosure includes a computer readable storage medium on which program code is stored, said program code including instructions that can be used to perform the steps of a multimedia resource displaying method, a multimedia resource matching method described in the method embodiments above, as described in the method embodiments above, and which will not be repeated herein.

Embodiments of the disclosure also provide a computer program that implements any of the methods of the preceding embodiments when executed by a processor. The computer program product may be specifically implemented by means of hardware, software, or a combination thereof. In one embodiment, said computer program product is embodied specifically as a computer storage medium. And in another embodiment, said computer program product is embodied specifically as a software product, such as a Software Development Kit (SDK), and the like.

It will be clear to those skilled in the art that, for ease and brevity of description, the specific processes of operation of the systems and apparatus described above may be referred to the corresponding processes in the preceding method embodiments and will not be repeated herein. In the several embodiments provided by the disclosure, it should be understood that the disclosed systems, devices and methods, can be implemented in other ways. The embodiments of the devices described above are merely schematic, for example, the division of the units described, which is only a logical functional division, can be divided in another way when actually implemented, and also, for example, multiple units or components can be combined or can be integrated into another system, or some features can be ignored, or not implemented. And the mutual coupling or direct coupling or communication connection shown or discussed can be indirect coupling or communication connection through some communication interface, device or unit, which can be electrical, mechanical or other forms.

Said units illustrated as separate components may or may not be physically separate, and the components displayed as units may or may not be physical units, i.e., they may be located in one place or may be distributed to multiple network units. Some or all of these units may be selected according to practical needs to achieve the purpose of this embodiment solution.

Alternatively, each functional unit in various embodiments of the disclosure may be integrated in a single processing unit, or the individual units may be physically present separately, or two or more units may be integrated in a single unit.

The described functionality, when implemented in the form of a software functional unit and sold or used as a separate product, may be stored in a processor-executable, non-volatile computer readable storage medium. It is understood that the technical solutions of the disclosure, or portions of the technical solutions, that essentially contribute to the prior art may be embodied in the form of a software product stored in a storage medium comprising a number of instructions to cause a computing device (which may be a personal computer, a server, or a network device, etc.) to perform all or some of the steps of the methods described in various embodiments of the disclosure. The aforementioned storage media includes: USB flash drives, removable hard drives, Read-Only Memory (ROM), Random Access Memory (RAM), disks, or CD-ROMs, and other media that can store program code.

Finally, it should be noted that the above-described embodiments are only specific embodiments of the disclosure to illustrate the technical solutions of the disclosure and not to limit the scope of protection of the disclosure, which is not limited thereto. Despite the detailed description of the disclosure with reference to the foregoing embodiments, it should be understood by those of ordinary skill in the art that any person skilled in the art may still modify or readily conceive of changes to the technical solutions described in the foregoing embodiments, or make equivalent substitutions for some of the technical features thereof, within the scope of the technology disclosed in the disclosure. These modifications, changes or replacements do not make the essence of the corresponding technical solutions out of the spirit and scope of the technical solutions of the embodiments of the disclosure, and shall all be covered by the scope of protection of the disclosure. Therefore, the scope of protection of the disclosure shall be stated to be subject to the scope of protection of the claims.

What is claimed is:

1. A multimedia resource displaying method, comprising:
    initiating a multimedia resource search request based on an acquired search keyword;
    acquiring at least one target multimedia resource matched with the search keyword, wherein each of the at least one target multimedia resource is formed by target multimedia and target entity object information of a target entity object associated with the search keyword, wherein the target entity object is first searched based on an entity object library, the target multimedia is then searched based on the target entity object and the entity object library, wherein the entity object library comprises identifiers of entity objects in an entity object identifier field, attribute information of the entity objects in an entity object attribute field, and identifiers of multimedia contents corresponding to at least a subset of the entity objects in a multimedia identifier field, wherein the target entity object is first searched based on the entity object library comprises determining an identifier of the target entity object based on comparing the search keyword with the attribute information of the entity objects in the entity object attribute field of the entity object library, and wherein the target multimedia is then searched based on the target entity object and the entity object library comprises determining the target multimedia based on the identifier of the target entity object in the entity object identifier field and an identifier of multimedia content corresponding to the target entity object in the multimedia identifier field of the entity object library;
    generating at least one first search result card corresponding to the at least one target multimedia resource, wherein the generating at least one first search result card corresponding to the at least one target multimedia resource further comprises:
        generating a multimedia display card based on the target multimedia included in each of the at least one target multimedia resource,
        generating an entity object display card based on the target entity object information included in each of the at least one target multimedia resource, wherein the multimedia display card and the entity object display card are two cards that are separate and independent from each other, and
        generating the at least one first search result card by overlaying the entity object display card on top of the multimedia display card; and
    displaying the at least one first search result card on a search result page, each of the at least one first search result card comprising the multimedia display card and the entity object display card.

2. The method according to claim 1, wherein displaying each of the at least one first search result comprises:
    displaying the entity object display card with the multimedia display card in a left-right structure;
    displaying the entity object display card with the multimedia display card in an up-down structure; or
    overlaying the entity object display card on top of the multimedia display card in a floating mode.

3. The method according to claim 1,
    wherein the search result page comprises a first display area and a second display area;
    wherein the method further comprises:
        acquiring at least one candidate multimedia matched with the search keyword, and
        displaying at least one second search result card in the second display area of the search result page, the second search result card comprising the candidate multimedia;
    wherein the displaying at least one first search result card on a search result page comprises:
        displaying one or more first search result cards in the first display area of the search result page.

4. The method according to claim 3, wherein the at least one first search result card comprises a plurality of first search result cards, and wherein displaying the plurality of first search result cards in the first display area of the search result page further comprises:
    acquiring association information between the target multimedia included in each target multimedia resource and a target entity object;
    determining a number of multimedia frames in which the target entity object appears in the target multimedia based on the association information; and determining a display sequence of the plurality of first search result cards based on the number of the multimedia frames.

5. The method according to claim 4, wherein the target multimedia comprises a target dynamic image, and the target dynamic image is generated based on the multimedia frames extracted from the target multimedia, and wherein the method further comprises:
  playing the target multimedia in the at least one first search result card based on the display sequence of the first search result cards, or playing the target dynamic image contained in the at least one first search result card.

6. The method according to claim 3, wherein the at least one first search result card is arranged and displayed in the first display area according to a horizontal direction, and wherein the method further comprises:
  in response to a touch operation of a user, controlling, in response to detecting that the touch operation forms a lateral sliding track in the first display area, the at least one first search result card to slide in a direction of the lateral sliding track.

7. The method according to claim 1, wherein the entity object display card is added with a link address of a detail page, and wherein the method further comprises:
  in response to determining that the entity object display card is triggered, skipping to the detail page of the target entity object according to the link address of the detail page.

8. A multimedia resource displaying apparatus, comprising:
  at least one processor; and
  at least one memory communicatively coupled to the at least one processor and storing instructions that upon execution by the at least one processor cause the apparatus to perform operations comprising:
  initiating a multimedia resource search request based on an acquired search keyword;
  acquiring at least one target multimedia resource matched with the search keyword, wherein each of the at least one target multimedia resource is formed by target multimedia and target entity object information of a target entity object associated with the search keyword, wherein the target entity object is first searched based on an entity object library, the target multimedia is then searched based on the target entity object and the entity object library, wherein the entity object library comprises identifiers of entity objects in an entity object identifier field, attribute information of the entity objects in an entity object attribute field, and identifiers of multimedia contents corresponding to at least a subset of the entity objects in a multimedia identifier field, wherein the target entity object is first searched based on the entity object library comprises determining an identifier of the target entity object based on comparing the search keyword with the attribute information of the entity objects in the entity object attribute field of the entity object library, and wherein the target multimedia is then searched based on the target entity object and the entity object library comprises determining the target multimedia based on the identifier of the target entity object in the entity object identifier field and an identifier of multimedia content corresponding to the target entity object in the multimedia identifier field of the entity object library;
  generating at least one first search result card corresponding to the at least one target multimedia resource, wherein the generating at least one first search result card corresponding to the at least one target multimedia resource further comprises:
    generating a multimedia display card based on the target multimedia included in each of the at least one target multimedia resource,
    generating an entity object display card based on the target entity object information included in each of the at least one target multimedia resource, wherein the multimedia display card and the entity object display card are two cards that are separate from each other, and
    generating the at least one first search result card by overlaying the entity object display card on top of the multimedia display card; and
  displaying the at least one first search result card on a search result page, each of the at least one first search result card comprising the multimedia display card and the entity object display card.

9. The multimedia resource displaying apparatus according to claim 8, wherein displaying each of the at least one first search result comprises:
  displaying the entity object display card with the multimedia display card in a left-right structure;
  displaying the entity object display card with the multimedia display card in an up-down structure; or
  overlaying the entity object display card on top of the multimedia display card in a floating mode.

10. The multimedia resource displaying apparatus according to claim 8,
  wherein the search result page comprises a first display area and a second display area;
  wherein the operations further comprise:
    acquiring at least one candidate multimedia matched with the search keyword, and
    displaying at least one second search result card in the second display area of the search result page, the second search result card comprising the candidate multimedia;
  wherein the displaying at least one first search result card on a search result page comprises:
    displaying one or more first search result cards in the first display area of the search result page.

11. The multimedia resource displaying apparatus according to claim 10, wherein the at least one first search result card comprises a plurality of first search result cards, and wherein displaying the plurality of first search result cards in the first display area of the search result page further comprises:
  acquiring association information between the target multimedia included in each target multimedia resource and a target entity object;
  determining a number of multimedia frames in which the target entity object appears in the target multimedia based on the association information; and
  determining a display sequence of the plurality of first search result cards based on the number of the multimedia frames.

12. The multimedia resource displaying apparatus according to claim 11, wherein the target multimedia comprises a target dynamic image, and the target dynamic image is generated based on the multimedia frames extracted from the target multimedia, and wherein the operations further comprise:
  playing the target multimedia in the at least one first search result card based on the display sequence of the first search result cards, or playing the target dynamic image contained in the at least one first search result card.

13. The multimedia resource displaying apparatus according to claim 10, wherein the at least one first search result card is arranged and displayed in the first display area according to a horizontal direction, and wherein the operations further comprise:

in response to a touch operation of a user, controlling, in response to detecting the touch operation forms a lateral sliding track in the first display area, the at least one first search result card to slide in a direction of the lateral sliding track.

14. The multimedia resource displaying apparatus according to claim 8, wherein the entity object display card is added with a link address of a detail page, and wherein the operations further comprise:

in response to determining that the entity object display card is triggered, skipping to the detail page of the target entity object according to the link address of the detail page.

15. A non-transitory computer-readable storage medium, storing a computer program, wherein the computer program, when executed by a processor, causes the process to perform operations comprising:

initiating a multimedia resource search request based on an acquired search keyword;

acquiring at least one target multimedia resource matched with the search keyword, wherein each of the at least one target multimedia resource is formed by target multimedia and target entity object information of a target entity object associated with the search keyword, wherein the target entity object is first searched based on an entity object library, the target multimedia is then searched based on the target entity object and the entity object library, wherein the entity object library comprises identifiers of entity objects in an entity object identifier field, attribute information of the entity objects in an entity object attribute field, and identifiers of multimedia contents corresponding to at least a subset of the entity objects in a multimedia identifier field, wherein the target entity object is first searched based on the entity object library comprises determining an identifier of the target entity object based on comparing the search keyword with the attribute information of the entity objects in the entity object attribute field of the entity object library, and wherein the target multimedia is then searched based on the target entity object and the entity object library comprises determining the target multimedia based on the identifier of the target entity object in the entity object identifier field and an identifier of multimedia content corresponding to the target entity object in the multimedia identifier field of the entity object library;

generating at least one first search result card corresponding to the at least one target multimedia resource, wherein the generating at least one first search result card corresponding to the at least one target multimedia resource further comprises:

generating a multimedia display card based on the target multimedia included in each of the at least one target multimedia resource, generating an entity object display card based on the target entity object information included in each of the at least one target multimedia resource, wherein the multimedia display card and the entity object display card are two cards that are separate and independent from each other, and generating the at least one first search result card by overlaying the entity object display card on top of the multimedia display card; and displaying the at least one first search result card on a search result page, each of the at least one first search result card comprising the multimedia display card and the entity object display card.

16. The non-transitory computer-readable storage medium according to claim 15, wherein displaying each of the at least one first search result comprises:

displaying the entity object display card with the multimedia display card in a left-right structure;

displaying the entity object display card with the multimedia display card in an up-down structure; or overlaying the entity object display card on top of the multimedia display card in a floating mode.

17. The non-transitory computer-readable storage medium according to claim 15, wherein the search result page comprises a first display area and a second display area; wherein the operations further comprise:

acquiring at least one candidate multimedia matched with the search keyword, and displaying at least one second search result card in the second display area of the search result page, the second search result card comprising the candidate multimedia;

wherein the displaying at least one first search result card on a search result page comprises:

displaying one or more first search result cards in the first display area of the search result page.

18. The non-transitory computer-readable storage medium according to claim 17, wherein the at least one first search result card comprises a plurality of first search result cards, and wherein displaying the plurality of first search result cards in the first display area of the search result page further comprises:

acquiring association information between the target multimedia included in each target multimedia resource and a target entity object;

determining a number of multimedia frames in which the target entity object appears in the target multimedia based on the association information; and determining a display sequence of the plurality of first search result cards based on the number of the multimedia frames.

19. The non-transitory computer-readable storage medium according to claim 18, wherein the target multimedia comprises a target dynamic image, and the target dynamic image is generated based on the multimedia frames extracted from the target multimedia, and wherein the operations further comprise:

playing the target multimedia in the at least one first search result card based on the display sequence of the first search result cards, or playing the target dynamic image contained in the at least one first search result card.

20. The non-transitory computer-readable storage medium according to claim 17, wherein the at least one first search result card is arranged and displayed in the first display area according to a horizontal direction, and wherein the operations further comprise:

in response to a touch operation of a user, controlling, in response to detecting the touch operation forms a lateral sliding track in the first display area, the at least one first search result card to slide in a direction of the lateral sliding track.

\* \* \* \* \*